United States Patent [19]
Rogers

[11] Patent Number: 5,889,784
[45] Date of Patent: Mar. 30, 1999

[54] PREDICTIVE FAILURE DETECTION FOR DATA STORAGE SYSTEMS

[75] Inventor: Uri Rogers, Boise, Id.

[73] Assignee: Hewlett-Packard Company, Palo Alto, Calif.

[21] Appl. No.: 598,829

[22] Filed: Feb. 5, 1996

[51] Int. Cl.$^6$ ................................................ G06F 11/00
[52] U.S. Cl. .......................................... 371/5.1; 371/21.1
[58] Field of Search .................................. 371/5.1, 21.1; 360/45, 46, 53, 39

[56] References Cited

U.S. PATENT DOCUMENTS

| | | | |
|---|---|---|---|
| 5,351,134 | 9/1994 | Yaguchi et al. | 358/435 |
| 5,392,295 | 2/1995 | Coker et al. | 371/21.2 |
| 5,552,942 | 9/1996 | Ziperovich et al. | 360/51 |
| 5,583,705 | 12/1996 | Ziperovich et al. | 360/45 |
| 5,663,733 | 9/1997 | Lennen | 342/357 |

OTHER PUBLICATIONS

Eureopean Search Report.
P.A. Ziperovich et al; CMOS Implementation of A Viterbi Detector for Hard Disk Drives; 05/12/93; pp. 10.3.1–10.3.4.

*Primary Examiner*—Phung M. Chung

[57] ABSTRACT

A method of predictive failure detection for a data storage system comprises (a) determining a first mean squared error (MSE) value for a read operation wherein the MSE value is indicative of a signal to noise ratio of the read operation, (b) determining a second MSE value for a read operation, and (c) comparing the first and second MSE values wherein a difference in the MSE values indicates a change in the data storage system. The MSE values are directly related to the distance between the storage medium and the read head element used in the read operation. A significant change in MSE values or a trend of increasing MSE values over time indicates a probable impending failure of the data storage system.

20 Claims, 8 Drawing Sheets

PREDICTIVE FAILURE DETECTION FOR DATA STORAGE SYSTEMS

FIELD OF THE INVENTION

This invention relates, in general, to data storage systems and, more specifically, to a method for predictive failure detection in a data storage system.

BACKGROUND OF THE INVENTION

In the computer industry, data storage systems, such as disk drives, have proven to be extremely useful as they allow computer users to store and retrieve information. Over time, computer users come to rely on their data storage systems. When the data storage system eventually fails, many of the users are not prepared and the result is that much, if not all, of the information they have stored on the system is lost. To avoid the loss, predictive failure detection methods have been developed to warn the user of an impending data storage system failure.

Previous predictive failure detection methods have been based on a bit error rate (BER) analysis which determines the number of bit errors relative to the number of bits transferred. These methods tend to be very slow because a BER analysis can take up to several minutes. For many users, this is an unsatisfactory use of their computer time.

Accordingly, objects of the present invention are to provide a new system and method for predictive failure detection.

SUMMARY OF THE INVENTION

According to principles of the present invention in a preferred embodiment, a method of predictive failure detection for a data storage system comprises (a) determining a first mean squared error (MSE) value for a first read operation wherein the MSE value is indicative of a signal to noise ratio of the read operation, (b) determining a second MSE value for a second read operation, and (c) comparing the first and second MSE values wherein a difference in the MSE values indicates a change in the data storage system. The MSE values are directly related to the distance between the read element and the storage medium. A significant difference in MSE values indicates a potential for failure of the data storage system due to a change in the distance between the read element and the storage medium.

According to further principles in a preferred method, if there is a significant difference between the first and second MSE values, at least a third MSE value is determined. The at least third MSE value is then compared to the second MSE value. If the second and at least third MSE values are similar, the first MSE value is stored to a trace log and the second MSE value is stored as a default MSE value. The predictive failure detection method is then repeated periodically. A trend of increasing MSE values in the trace log indicates a probable impending failure of the data storage system.

Other objects, advantages, and capabilities of the present invention will become more apparent as the description proceeds.

DETAILED DESCRIPTION OF THE INVENTION

The present invention utilizes mean squared error (MSE) values determined from the read channel/circuitry of a data storage system during read operations for predicting failure of the storage system. These MSE values are related directly to the distance between the read element and the storage medium. Each different type of data storage system may have a different name for the distance between the read head and the storage medium. For ease of discussion purposes, and rather than referencing all possible types of data storage systems, the distance between the read element and the storage medium in this disclosure will be referred to as fly height. The fly height increases as debris builds up between the storage medium and the read head. Increasing fly height causes failure in a data storage system because of increased head bounce and/or signal to noise degradation. Under the present invention, this increasing fly height is reflected in a trend of increasing MSE values.

Figure 1:
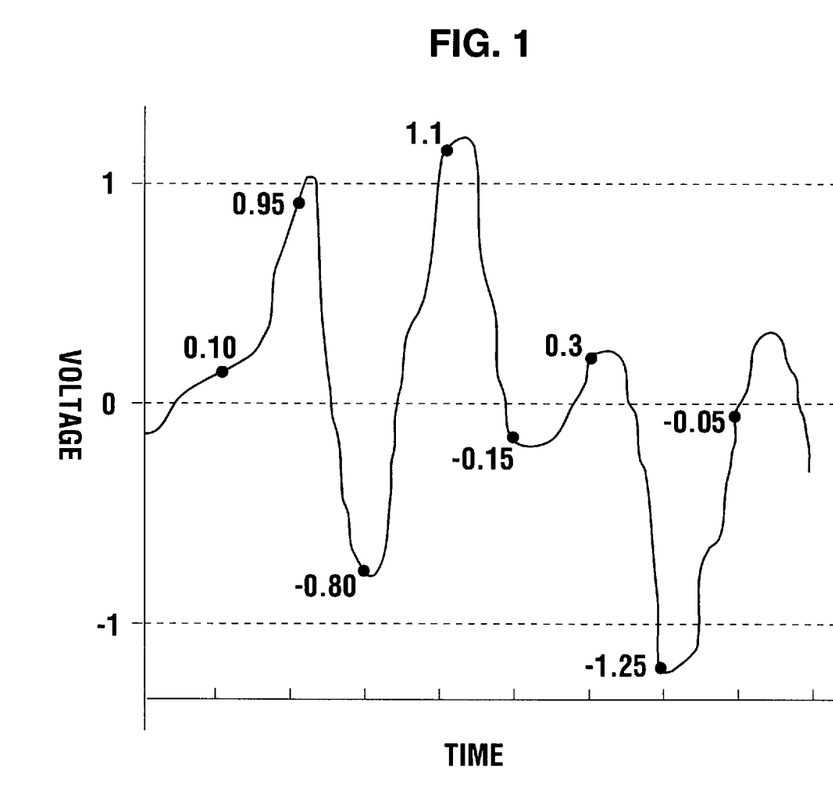
FIG. 1 shows an example of an analog signal as it is read from a storage medium and sample points along the signal for use by a sequence detector in the present invention.

A preferred method of determining the MSE values is by normalizing the path metrics in a channel which uses path metrics in sequence detection. Although there are other methods of determining MSE values which may be used in this invention, for example, the slicer method, this disclosure will focus on normalizing path metrics for ease of discussion purposes. Partial response, maximum likelihood (PRML) channels are examples of channels commonly known in the art which use path metrics in sequence detection. To this regard, the wavetrain in FIG. 1 is an example of an analog signal as it is read from a storage medium. The points on the graph in FIG. 1 represent samples of that signal to be used by a sequence detector. The error of each sample is the difference between the sample and what the sample should be in a noiseless system. In this example, the sample should be either 1, 0 or −1. The errors are squared for use in sequence detection.

Figure 2:
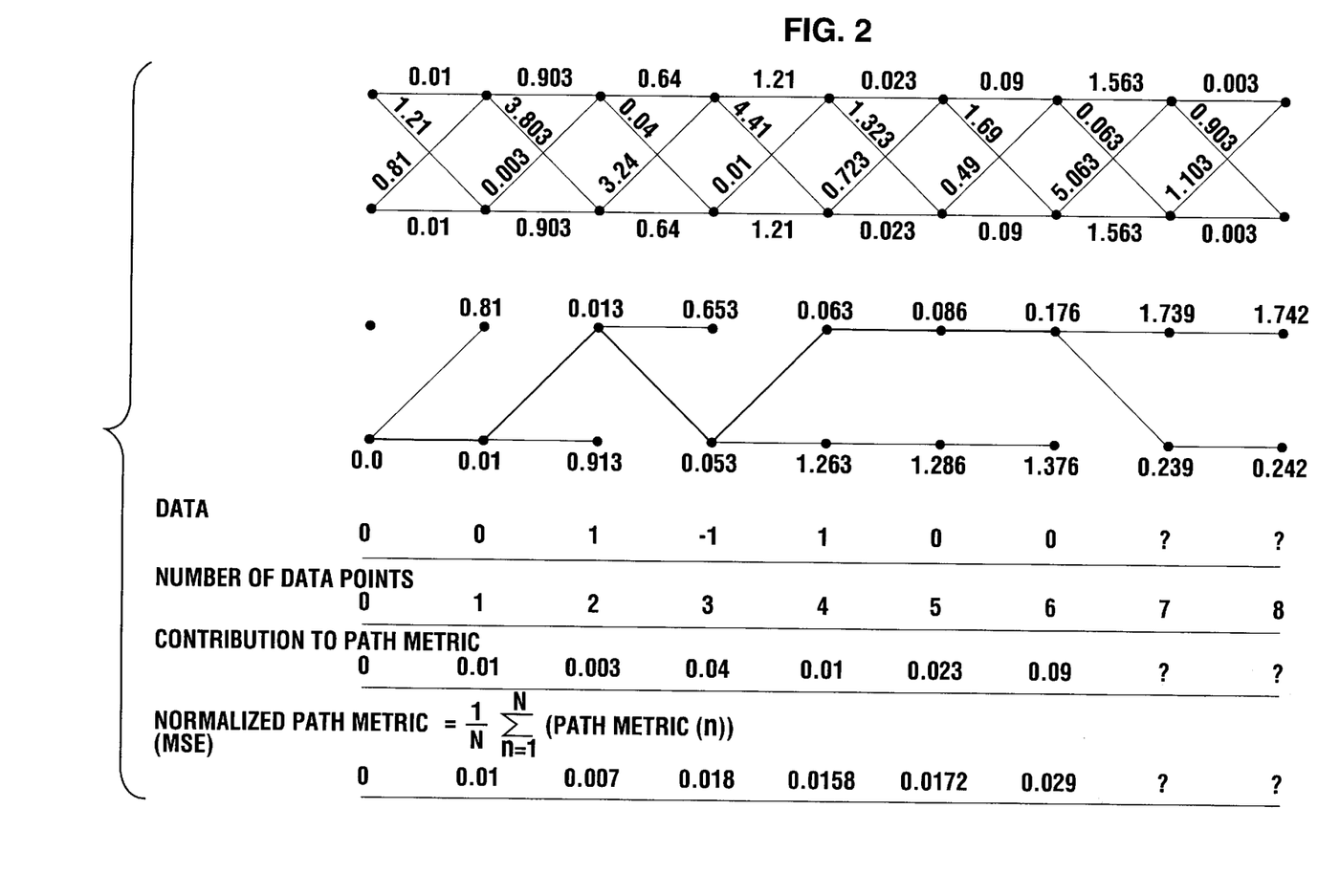
FIG. 2 shows a trellis decoding process for a PRML channel using the samples in FIG. 1 whereby an MSE value is determined which relates to the distance between the read element and the storage medium.

FIG. 2 shows a trellis decoding process using path metrics in sequence detection. The upper trellis diagram in FIG. 2 shows the squared errors of the samples in FIG. 1 for each of the three values that the sample could be. The horizontal lines on top and bottom of the upper trellis diagram show what the squared error is if the sample is a 0. The diagonal lines going up and to the right show what the squared error is if the sample is a 1. The diagonal lines going down and to the right show what the squared error is if the sample is a −1. The lower trellis diagram in FIG. 2 shows the sum of the squared errors for possible sequences of values. The data in FIG. 2 is the value which is determined by using the trellis diagram. The number of data points in FIG. 2 is the running total of the number of samples used in the trellis diagram.

The sum of the squared errors is the path metric. The contribution to the path metric in FIG. 2 lists the contribution each sample point makes to the overall path metric. The numbers along the bottom of FIG. 2 are the normalized path metrics or mean squared error (MSE) values. The MSE values are determined by summing the individual contributions to the path metric together and dividing them by the number of data points.

Gaussian noise in a data storage system is sufficiently stable to be considered constant, absent any changes to the system or the operating environment. The MSE value is related to the gaussian noise in a system by the following equation:

$$MSE \simeq \text{noise variance} = (\text{noise standard deviation})^2 = \sigma^2$$

The MSE value may therefore also be considered constant, absent any changes to the data storage system or the operating environment.

As the fly height of a data storage system increases, the signal strength decreases. This relationship is well known in the art. Since the noise in the system is relatively constant, a decrease in the signal strength decreases the signal to noise ratio (SNR). The read channel senses the change in signal strength and amplifies the signal so that it may properly interpret the signal. The amplifier cannot distinguish between the signal and the noise. As a result, the noise in the system is equally amplified. The amplified noise is reflected by an increased MSE value, and is inversely related to the signal to noise ratio of the system. The fly height is therefore directly related to the MSE value.

An advantage of using an MSE value instead of a BER to predict failure is that determining an MSE value is much faster than determining a BER. Performing a BER analysis can take up to several minutes, and during this time, the data storage system cannot perform other functions such as writing or reading, other than reading the data which it is testing. Determining an MSE value takes less than a second and can be accomplished while the data storage system is performing its normal functions.

Figure 3:
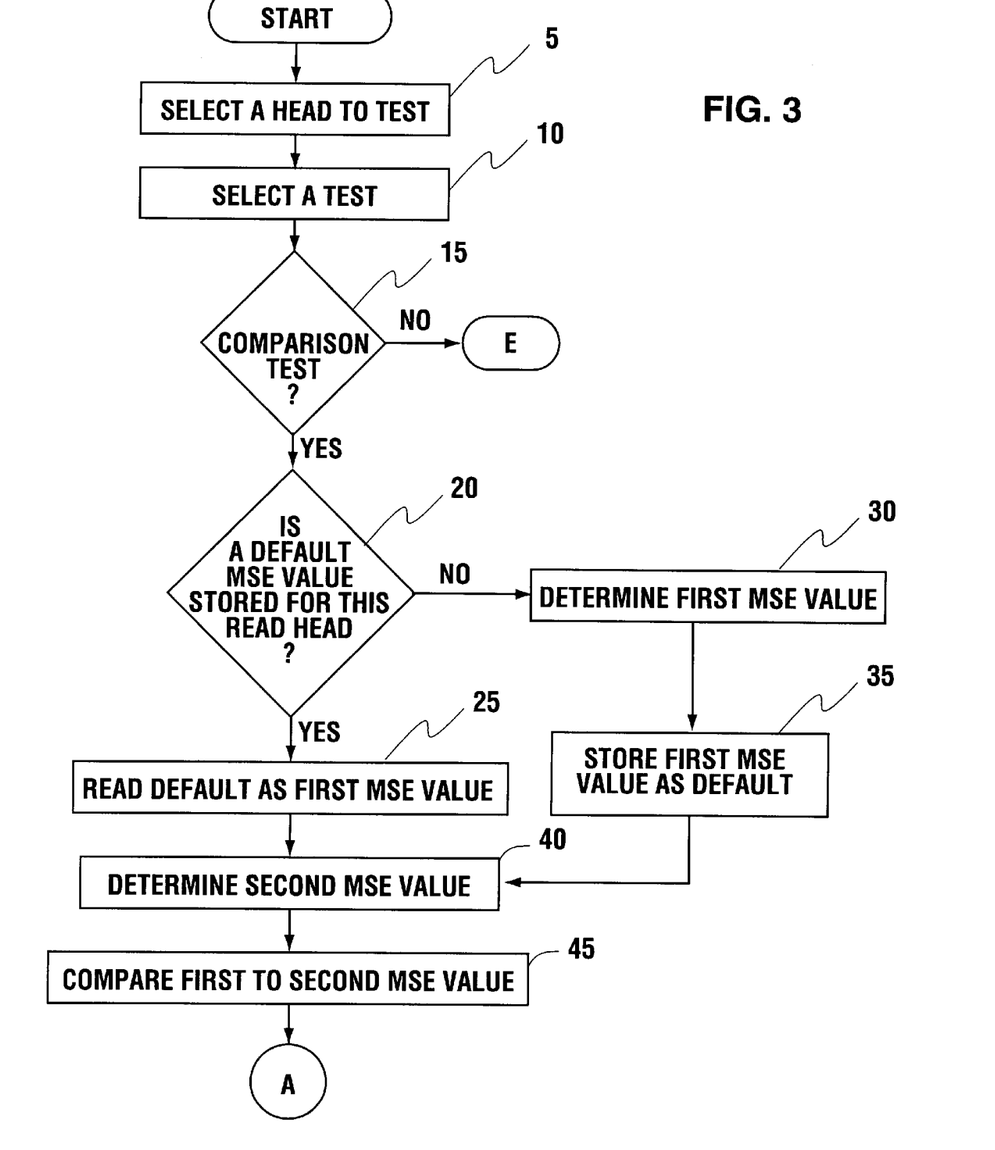
FIGS. 3-8 show a flow chart depicting a preferred method of the present invention of predictive failure detection for data storage systems.

Referring now to FIG. 3, a flow chart depicts a preferred method of the present invention for predictive failure detection. This preferred method takes advantage of existing read/write architectures as much as possible to keep manufacturing and implementation costs to a minimum. Although not all details are described relative to conventional data storage systems, sufficient details are described such that the method of the present invention can be easily understood in relation to conventional data storage systems by those of ordinary skill in the art.

The first step of the predictive failure detection method is to select which read/write head to test 5. Preferably all heads are eventually tested for a data storage system. The next step is to select which type of test is to be performed 10. The three preferred types of tests are comparison, threshold, and write.

If a comparison test 15 is selected, a determination 20 is made regarding whether an MSE value has already been stored as a default value. If an MSE value has already been stored as a default value, the first MSE value is determined by reading the default MSE value 25. If there has been no MSE value stored as a default MSE value, a first MSE value is determined for a first read operation 30. As previously discussed, the MSE value is determined by normalizing the path metric determined in a read operation. This first MSE value is then stored, in either volatile or nonvolatile memory, as the default value 35 for later comparisons until it is replaced by another default value. In a preferred method, the first MSE value will be determined and stored as the default value while at the factory after all factory tuning has been completed.

A second MSE is then determined 40 for a second read operation. In a preferred method, the second MSE value is determined a significant amount of time after the first MSE value or after a significant change occurs in surrounding environmental conditions. Allowing a time difference between the determination of the first and second MSE values provides an opportunity for debris to build up between the head and the storage medium. This debris causes the head to fly higher thus increasing the MSE value. A significant amount of time is an amount of time during which enough of the debris may build up between the head and the storage media to cause the head to fly observably higher. For example, a second MSE value may be determined after the storage system has been moved from the factory to the destination where it is to be used.

A comparison is next made between the default and second MSE values 45. A match between the two values 50 (FIG. 4) indicates there has been no change in the fly height of the head. Since no change is indicated in the fly height, no failure is expected in that head of the data storage system and the test may be concluded.

Figure 4:
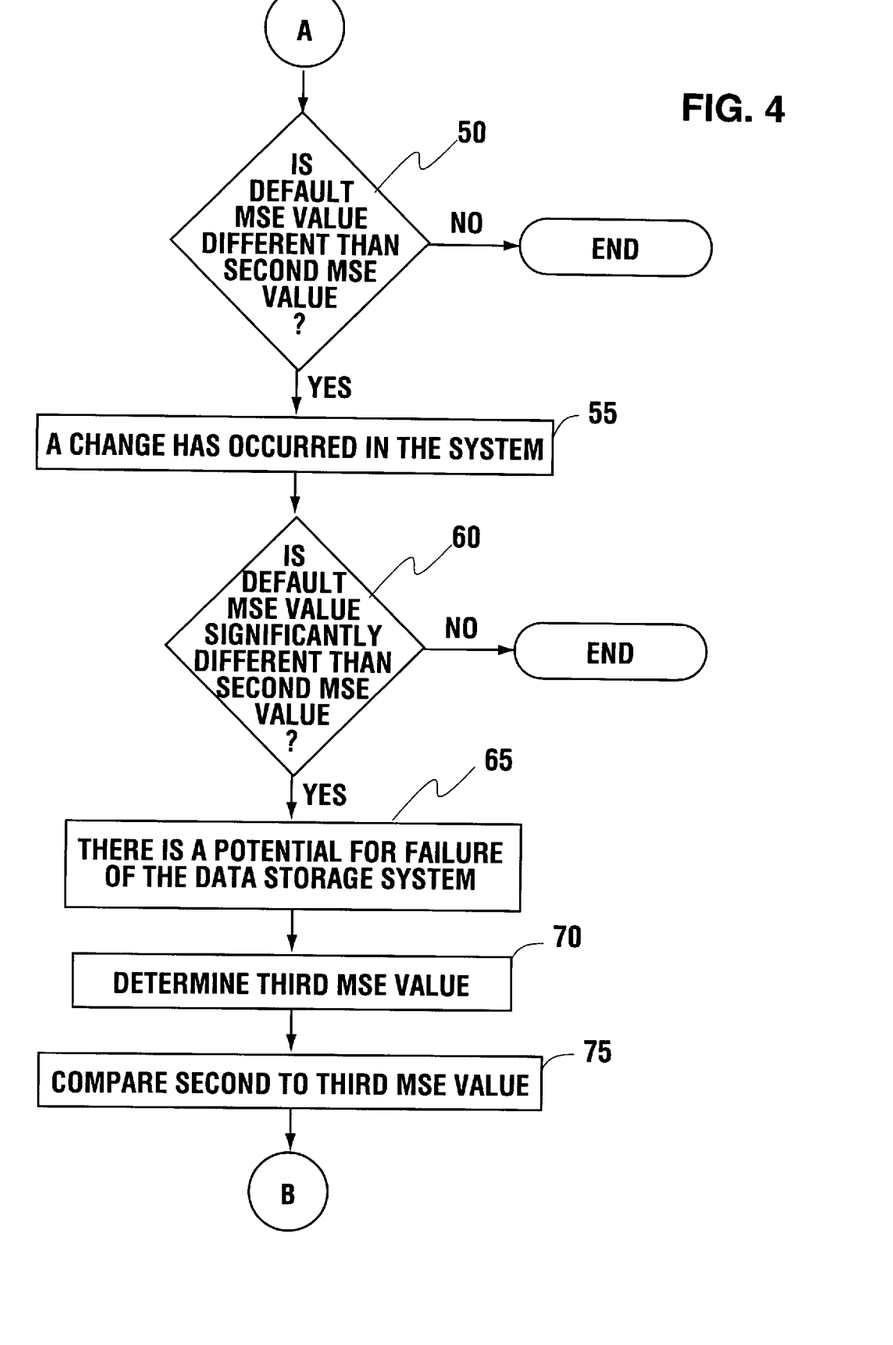

If there is a difference 50 between the default and second MSE values, a change in the data storage system has occurred 55. This change can take several forms including, but not limited to, a change in fly height due to debris buildup, a change in fly height due to a change in air pressure, a change in the electrical noise level, a damaged component of the data storage system, or any combination of these. In order to determine if this change is an indication of a probable impending failure, the details of the change are considered.

A significant difference between the default and second MSE values 60 indicates a potential for failure of the data storage system 65. In a preferred method, a significant difference is an increase from the default to the second MSE value of at least two orders of magnitude of an equivalent bit error rate (BER). As discussed above, the MSE value is not the same as the BER. The BER can, however, be approximated from the MSE value using the following equations.

$$BER \approx P_e = Q\left(\frac{da}{2\sigma}\right)$$

$$Q = \frac{1}{\sqrt{2\pi}} \int_{\left(\frac{da}{2\sigma}\right)}^{\infty} e^{\frac{-x^2}{2}} dx$$

$$MSE \cong \sigma^2$$

Where:
 $P_e$=Probability of error
 d=length of minimum distance error event
 a=signal level
 $\sigma$=noise standard deviation
 a/$\sigma$=Signal to noise ratio (SNR)

An increase of an order of magnitude of equivalent BER means a change in the MSE value which results in an increase in the BER, as calculated from MSE values, of an order of magnitude (i.e., from $10^{-10}$ to $10^{-9}$ $$\frac{\text{errors}}{\text{bits transferred}}$$

Next, at least a third MSE value is determined 70 once a potential for failure of the data storage system is indicated by a significant difference in MSE values. In a preferred method, the third MSE value is determined a significant amount of time after the second MSE value. As discussed above, allowing a time difference between the determination of MSE values provides an opportunity for debris to build up between the head and the storage medium. The amount of time between determining second and third MSE values could be much less than between determining first and second MSE values. For example, a third MSE value may be determined about one hour after the second MSE value. The reason for needing less time between determining MSE values is because once the head begins flying higher due to debris buildup, the head begins to bounce onto the storage medium which produces more debris. The presence of more debris causes the debris to build up faster between the head and the storage medium.

The second MSE value is next compared to the third MSE value 75. If the third MSE value is not similar to the second MSE value 80 (FIG. 5) and not significantly greater than the second MSE value 85, the third MSE value is significantly less than the second MSE value. If the third MSE value is significantly less than the second MSE value, no impending failure is indicated and the test may be concluded. In fact, this difference may indicate that the fly height is returning to the level it was when the default MSE was determined. If the third MSE value is significantly greater than the second MSE value 85, this indicates a probable impending failure of the data storage system 90.

Figure 5:
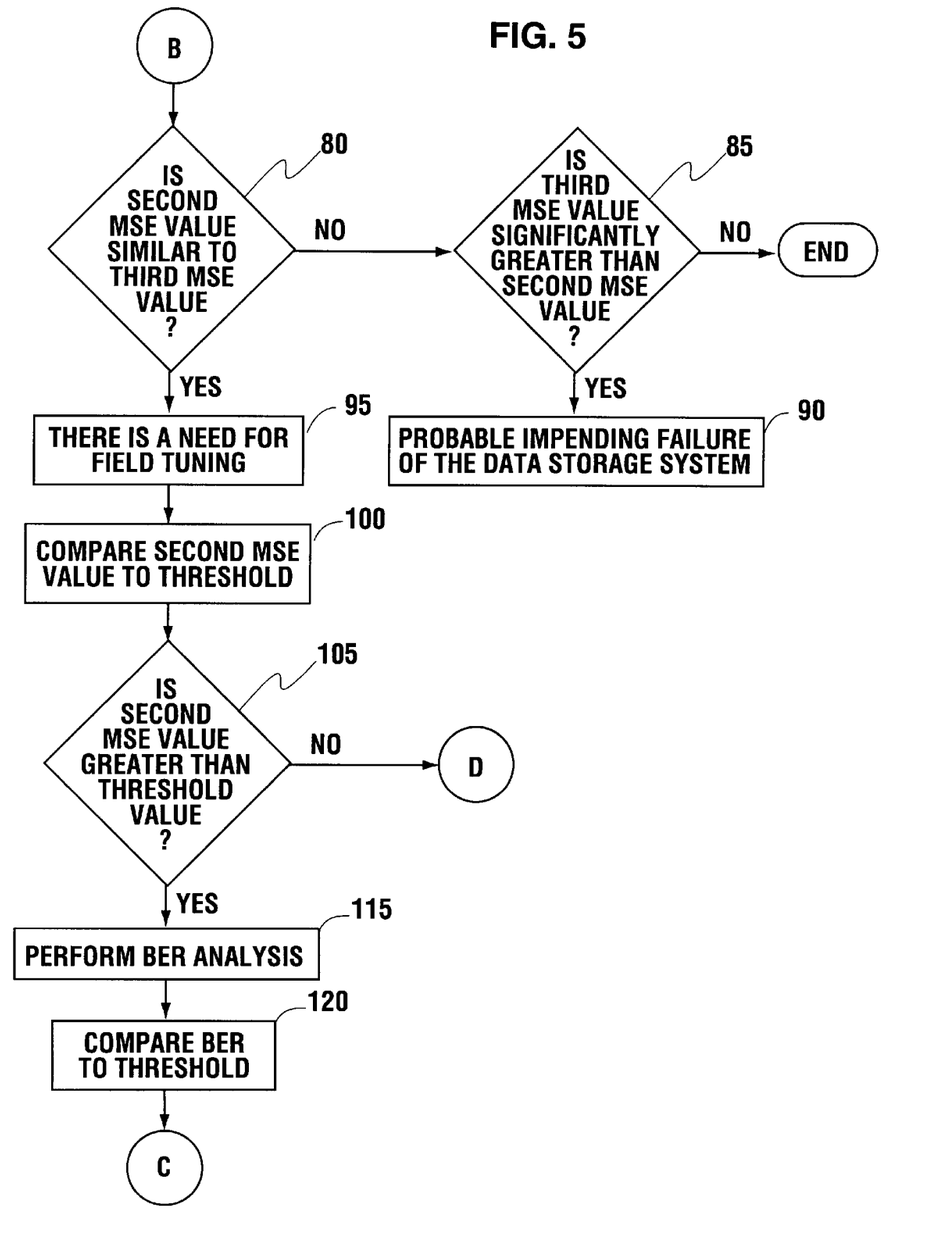

On the other hand, if the third MSE value is similar to the second MSE value 80, this indicates a need for field tuning 95. Field tuning compensates for the change to the system in order to read and write data more accurately. The data storage system may be field tuned if the system has the capabilities to do so. If the system does not have field tuning capabilities or such capabilities are not chosen to be implemented, then the second MSE value is compared to a predetermined threshold value 100.

Figure 6:
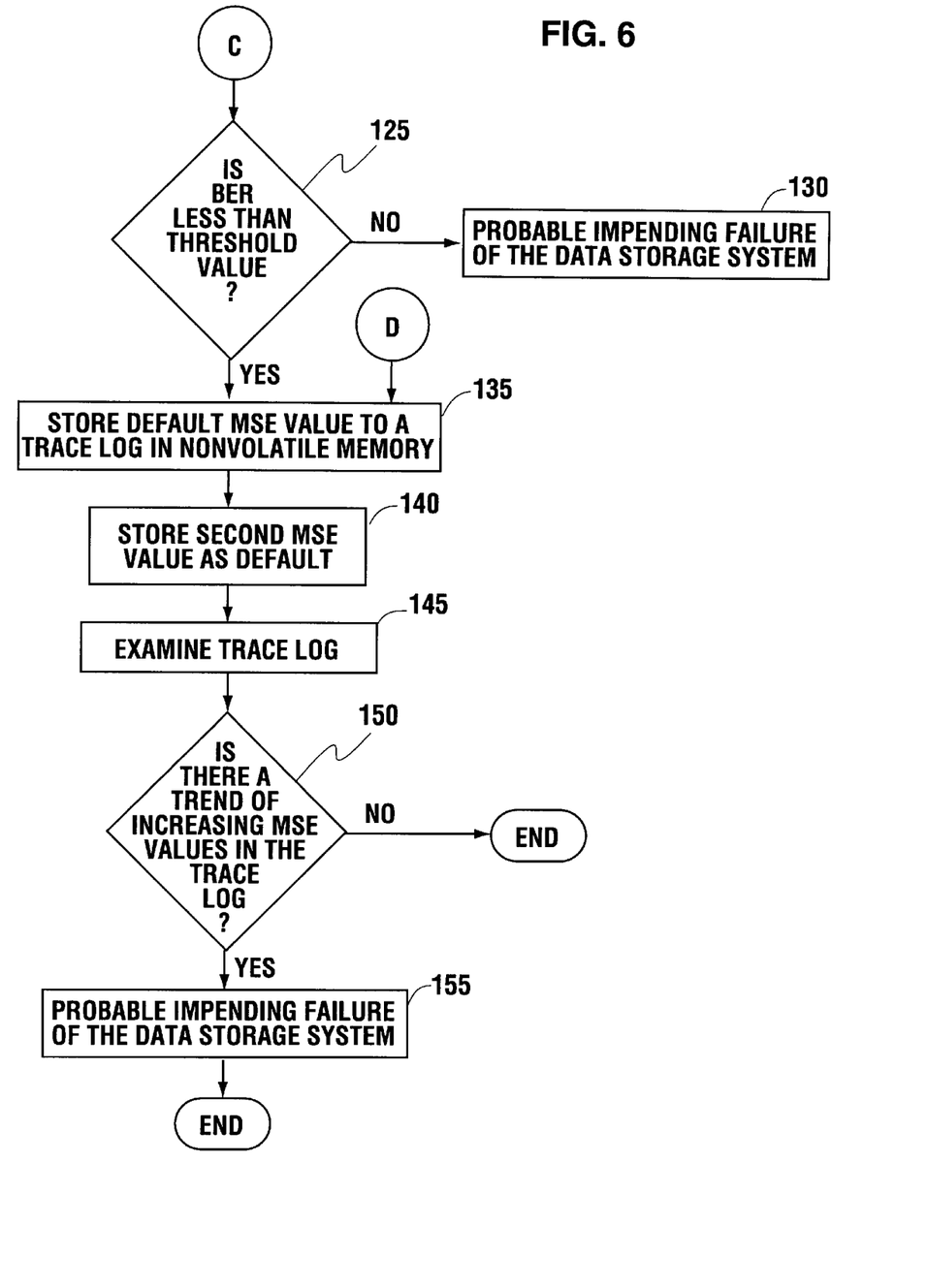

If the second MSE value is not greater than the threshold value 105, the default MSE value is retained in a trace log 135, and the second MSE value is stored as the new default MSE value 140 (FIG. 6). If the second MSE value is greater than the threshold value, a BER analysis is preformed 115 (FIG. 5). The BER is then compared to a predetermined threshold value 120. If the BER is not less than the threshold value 125 (FIG. 6), this indicates a probable impending failure of the data storage system 130.

If the BER is less than the threshold value 125, the default MSE value is retained in a trace log 135, and the second MSE value is stored as the new default MSE value 140. The default MSE value is replaced in order to account for changes to the data storage system which are not indicative of a failure, but which do affect the fly height, such as a change in air pressure.

The trace log is then examined 145 to determine if there is a trend of increasing MSE values 150 stored therein. If there is such a trend 150, this indicates a probable impending failure of the data storage system 155. If a trend of increasing MSE values does not exist in the trace log 150, no impending failure is indicated and the test may be concluded.

The trace log is preferably stored in a nonvolatile memory other than the storage medium in the data storage system being tested. This allows access to the trace log after failure of the data storage system. The trace log may then be used to provide information on disk failure patterns.

Figure 7:
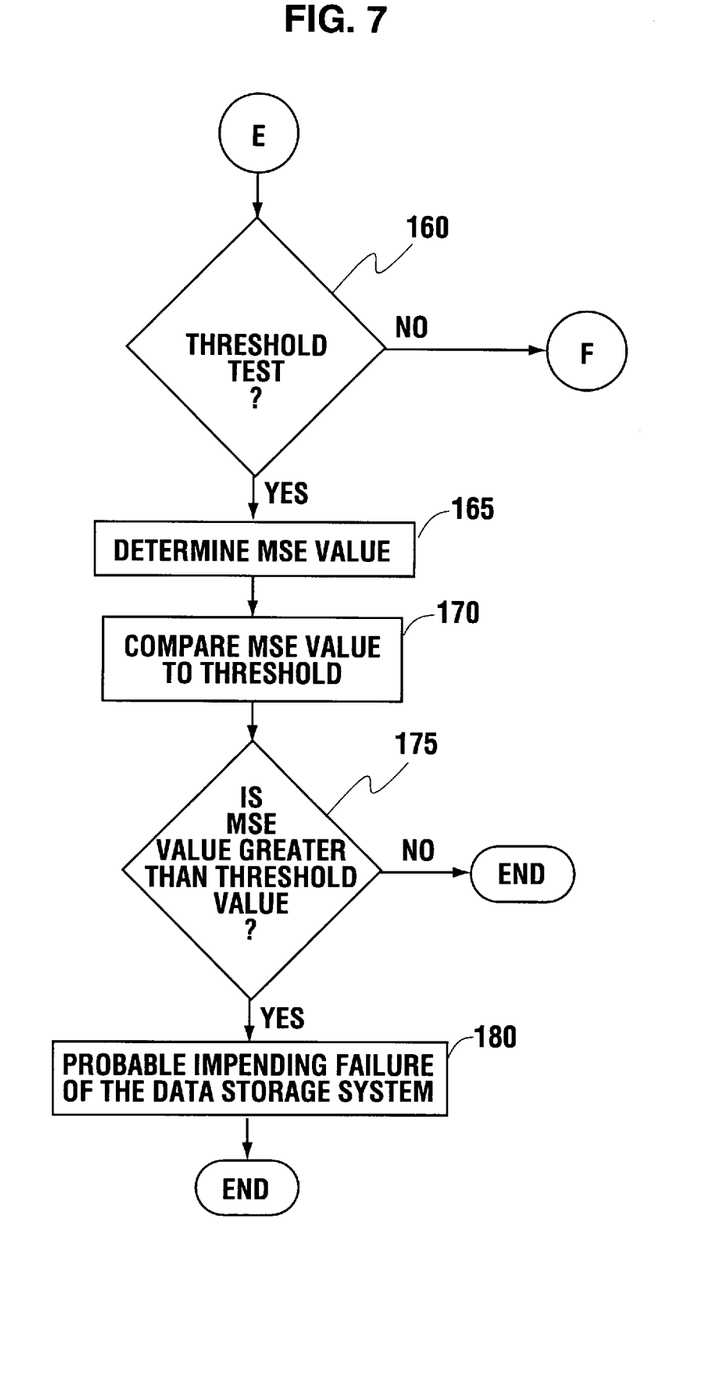

Thus far, the comparison test has been discussed. Another test which may be performed is the threshold test 160 (FIG. 7). If the threshold test is selected, the first step is to determine an MSE value 165. This MSE value is then compared to a predetermined threshold value 170. If the MSE value exceeds the threshold value 175, this indicates a probable impending failure of the data storage system 180. If the MSE value does not exceed the threshold value 175, no impending failure is indicated and the test may be concluded.

Figure 8:
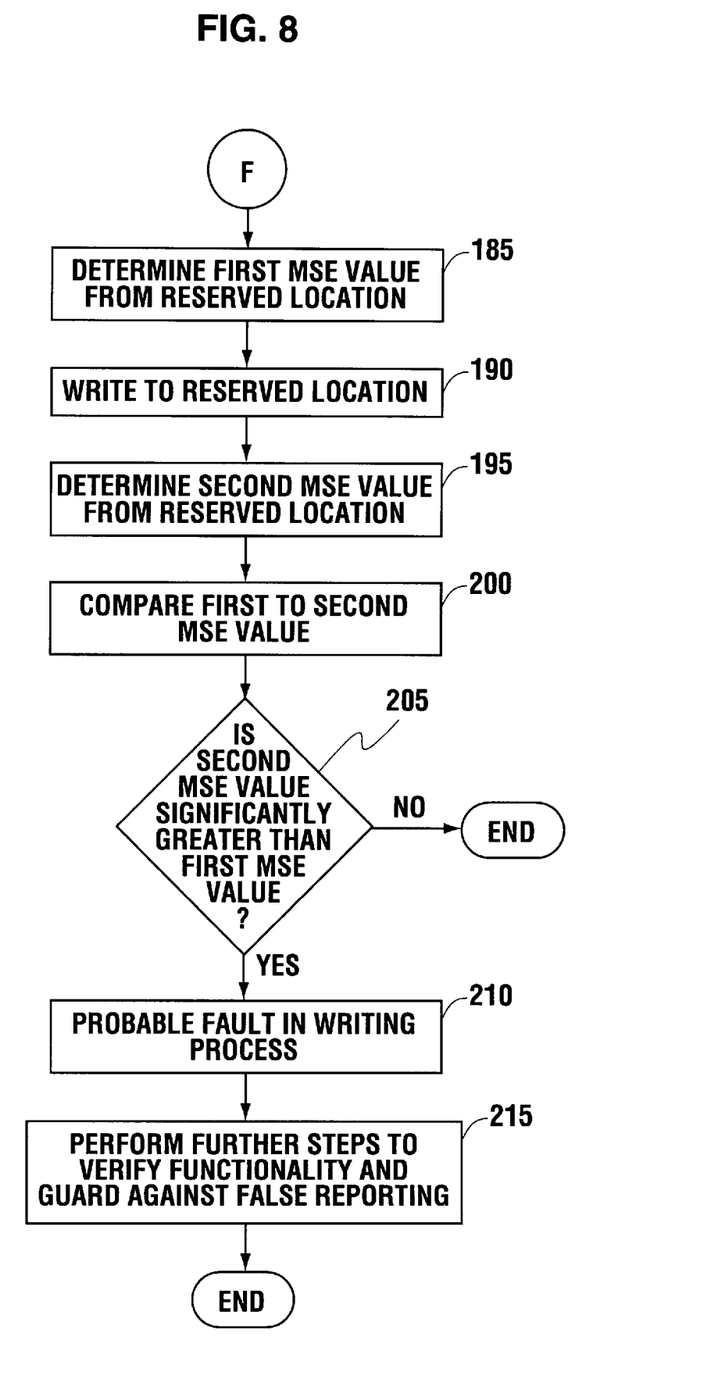

The final test which may be selected is the write test. If the write test is selected, a first MSE value is determined by reading a reserved location on the storage medium 185 (FIG. 8). The next step is to write to the reserved location on the storage medium 190. Since MSE values are determined by normalizing the path metric and not by comparing the pattern read to a known pattern, no special pattern need be written to this location.

Next, a second MSE value is determined from the reserved location 195. The reserved location is a location on the storage medium which is not written to other than in the write test. The reason for reserving a location is to ensure that the first MSE value is determined from a pattern which was written a period of time prior to when the second MSE value is determined. The period of time provides an opportunity for faults in the write process to develop to a point where they may be observed.

The first and second MSE values are then compared 200. If the second MSE value is significantly greater than the first MSE value 205, this indicates a probable fault in the writing process 210. Further steps to verify functionality and guard against false reporting may then be performed 215. If the second MSE value is not significantly greater than the first MSE value 205, no fault in the writing process is indicated and the test may be concluded.

Finally, at each step in the preferred method of the present invention wherein it is determined that there is a probable impending failure of the data storage system, any one of a number of options may be selected as conventional in the art to address the issue of a probable impending failure. Examples include servicing the system or backing up the data stored in the system.

In summary, what has been described above are the preferred embodiments for a system and method for predictive failure detection in a data storage system. It will be obvious that the present invention is easily implemented utilizing any of a variety of hardware and software existing in the art. Furthermore, while the present invention has been described by reference to specific embodiments, it will be obvious that other alternative embodiments and methods of implementation or modification may be employed without departing from the true spirit and scope of the invention.

What is claimed is:

1. A method of predictive failure detection for a data storage system having at least one storage medium, the method comprising:

(a) determining a first mean squared error (MSE) value for a first read operation from the at least one storage medium wherein the MSE value is indicative of a signal to noise ratio of the read operation;

(b) determining a second MSE value for a second read operation; and, (c) comparing the first and second MSE values wherein a difference in the MSE values indicates a change in the data storage system.

2. The method of claim 1 wherein the data storage system includes a plurality of read heads and wherein steps (a), (b), and (c) are repeated for each read head.

3. The method of claim 1 further including: storing the first MSE value as a default value in a nonvolatile memory.

4. The method of claim 1 wherein the difference in the MSE values indicates a change in signal strength, noise, or both signal strength and noise.

5. The method of claim 1 wherein a significant difference in the MSE values indicates a potential for failure of the data storage system, the significant difference being measured relative to a predetermined threshold value.

6. The method of claim 5 wherein the significant difference is an increase of two or more orders of equivalent Bit Error Rate (BER).

7. The method of claim 5 further including, upon detection of a significant difference in MSE values:

(a) determining at least a third MSE value for at least a third read operation and, (b) comparing the second and at least third MSE values wherein a similarity in the MSE values indicates a need for field tuning of the data storage system.

8. The method of claim 7 further including: if the second and third MSE values are similar, storing the first MSE value to a trace log and storing the second MSE value as a default value.

9. The method of claim 8 further including: storing the trace log to a nonvolatile memory which may be accessed even though the data storage system has failed.

10. The method of claim 9 wherein the nonvolatile memory is an Electrically Erasable Programmable Read Only Memory (EEPROM) or a flash memory.

11. The method of claim 8 further including: repeating the steps of claims 1, 5, 7 and 8, such that a plurality of MSE values are stored in the trace log, and wherein a trend of increasing MSE values in the trace log indicates a probable impending failure of the data storage system.

12. The method of claim 1 further including:

(a) performing a bit error rate (BER) analysis and, (b) comparing the BER to a threshold value wherein the BER being above the threshold value indicates a probable impending failure of the data storage system.

13. The method of claim 1 further including:

(a) determining the first MSE value from a reserved location on the at least one storage medium;

(b) writing to the reserved location;

(c) determining the second MSE value from the reserved location; and, (d) comparing the first and second MSE values wherein an increase in the second MSE value over the first MSE value indicates a probable writing fault.

14. The method of claim 1 wherein the first MSE value is determined by reading a default MSE value.

15. The method of claim 1 wherein each MSE value is determined by normalizing a path metric produced during the respective read using sequence detection.

16. A method of predictive failure detection for a data storage system having at least one storage medium, the method comprising:

(a) determining a mean squared error (MSE) value for a read operation from the at least one storage medium wherein the MSE value is indicative of a signal to noise ratio of the read operation; and, (b) comparing the MSE value to a threshold value wherein the MSE value exceeding the threshold value indicates a probable impending failure of the data storage system.

17. A system for predictive failure detection in a data storage system having at least one storage medium, the predictive failure detection system comprising:

(a) means for determining a first mean squared error (MSE) value for a first read operation from the at least one storage medium wherein the MSE value is indicative of a signal to noise ratio of the read operation;

(b) means for determining a second MSE value for a second read operation; and, (c) means for comparing the first and second MSE values wherein a difference in the MSE values indicates a change in the data storage system.

18. The system of claim 17 further including:

(a) means for performing a bit error rate (BER) analysis and, (b) means for comparing the BER to a threshold value wherein the BER being above the threshold value indicates a probable impending failure of the data storage system.

19. The system of claim 17 further including:

(a) means for determining at least a third MSE value for at least a third read operation; and, (b) means for comparing the second and at least third MSE values wherein a similarity in the MSE values indicates a need for field tuning of the data storage system.

20. The system of claim 17 further including:

(a) means for determining the first MSE value from a reserved location on the at least one storage medium;

(b) means for writing to the reserved location;

(c) means for determining the second MSE value from the reserved location; and, (d) means for comparing the first and second MSE values wherein an increase in the second MSE value over the first MSE value indicates a probable writing fault.

* * * * *